(12) United States Patent
Bienias

(10) Patent No.: US 6,813,610 B1
(45) Date of Patent: Nov. 2, 2004

(54) CUSTOM DESIGN AND MANUFACTURING PROGRAM FOR INTERIOR DESIGNS

(76) Inventor: Ronald Marion Bienias, 39 Oak La., Lemont, IL (US) 60439

( * ) Notice: Subject to any disclaimer, the term of this patent is extended or adjusted under 35 U.S.C. 154(b) by 338 days.

(21) Appl. No.: 08/724,315

(22) Filed: Oct. 1, 1996

(51) Int. Cl.[7] .............................................. G06F 17/60
(52) U.S. Cl. ......................................... 705/27; 705/29
(58) Field of Search ..................... 705/27, 29; 364/512

(56) References Cited

U.S. PATENT DOCUMENTS

| | | | | |
|---|---|---|---|---|
| 4,862,376 A | * | 8/1989 | Ferriter et al. ............... | 364/468 |
| 5,109,337 A | * | 4/1992 | Ferriter et al. ............... | 364/401 |
| 5,111,392 A | * | 5/1992 | Malin .......................... | 364/401 |
| 5,255,207 A | * | 10/1993 | Cornwell ..................... | 364/512 |
| 5,260,866 A | * | 11/1993 | Lisinski et al. .............. | 364/401 |
| 5,307,261 A | * | 4/1994 | Maki et al. .................. | 364/401 |
| 5,515,269 A | * | 5/1996 | Willis et al. ................. | 364/401 |
| 5,668,736 A | * | 9/1997 | Douglas et al. .............. | 364/512 |
| 6,055,516 A | * | 4/2000 | Johnson et al. ............... | 705/27 |

* cited by examiner

*Primary Examiner*—James W. Myhre
(74) *Attorney, Agent, or Firm*—John P. Halvonik

(57) ABSTRACT

A computerized system for providing a consumers with a means of designing and visualizing customized design interiors using components or parts chosen from off the shelf components in order to create a custom interior with a minimum of effort on the part of the sales people in the show room. Such program will provide a visual representation of the particular items and arrangement chosen by the consumer upon his selecting such components from the data base. The software is designed to provide prompts, initially, to the buyer in order to determine the size of the interior space under consideration, The computer will then provide a visual, on screen, representation of the components that the customer has chosen and place them upon that design environment that the consumer has indicated.

4 Claims, 3 Drawing Sheets

In store custom designing and check-out process

In store custom designing and check-out process

CUSTOM DESIGN AND MANUFACTURING PROGRAM FOR INTERIOR DESIGNS

BACKGROUND AND FIELD OF THE INVENTION

The invention relates to the field of custom interior design, and in particular to a computerized system that is designed to allow consumers to pick and chose from among many design alternatives using standard off the shelf component parts in order to create a customized interior furniture design for e.g. a bookcase or shelves. Such a system will provide a ready visual display on a display monitor of those items e.g. a bookcase, that are chosen by the consumer along with particular overall arrangement that this will create in the room. In addition, the system can generate pricing information i.e. a purchase order and a bill of materials for that particular arrangement. The consumer can then print the bill of materials and take it to a check out station in the store where the consumer can present this bill as an order as well as make payment arrangements.

It is believed that the system will find utility in creating an on-screen image of a furniture arrangement or similar living space arrangement for consumers on a display monitor. Such display will aid consumers in the purchase of any number of custom designed living and working space arrangements including: office furniture, bookcases, libraries, kitchen and bath cabinets, entertainment centers, furniture designs, industrial and commercial working space arrangements, institutional designs, domestic arrangements, etc. For purpose of discussion the term: "living space arrangement" may be used to refer to all of these areas of interior design. Other areas of design are possible as well.

It is believed that the system will provide the consumer with a system for selecting their own unlimited options from standard off the shelf component parts already provided by seller in order to allow them to create a one of a kind design. Such a system is believed to eliminate the package approach by manufactures and adds flexibility to the seller. Such a system will provide the consumer with a print out of the costs of the system he has chosen and provide a bill of materials that he or she can take to a check out area and make payment arrangements. Options, upgrades, alternatives, costs are readily available to consumer. The system allows the consumer to recalculate the costs of going with a less expensive or more expensive arrangement without having to take time away from the sales people in the show room. The system also facilitates the check out process by providing a readily available bill of materials that the consumer can simply take to the check out area when he or she has decided on a system.

The availability of different standard off the shelf component parts in the inventory can be programmed and the consumer can know early on in the buying process which items are or are not available and/or how long these items will take to order. This provides a cost effective method for consumer and the retail seller and provides a custom service at moderate prices, therefore, better meeting the needs of consumers shopping in a show room where space and time are at a premium for the retail operator of the store.

SUMMARY OF THE INVENTION

A computerized system for providing consumers with a means of designing and visualizing customized design interiors using components or parts chosen from off the shelf components in order to create a custom interior with a minimum of effort on the part of the sales people in the show room. Such program will provide a visual representation of the particular items and arrangement chosen by the consumer upon his selecting such components from the data base. The software is designed to provide prompts, initially, to the buyer in order to determine the size of the interior space under consideration, The computer will then provide a visual, on screen, representation of the components that the customer has chosen and place them upon that design environment that the consumer has indicated.

Further prompts by the computer will request choices as to colors, dimension of space the product will occupy, intended use, special needs, etc. Further prompts in the system will ask the consumer on what they like or don't like and continue with process until customer arrives at a design that he or she is comfortable with. Alternative designs may be provided by the computer based on the maintainer of the system (e.g. a retailer) and what standard components are available and based on the consumer's suggestions. Customer can then select materials from the storage at the retail point where the system is or they will be pulled by seller, or whatever method seller wishes.

At the end of the session, the computer will prompt to see if the pricing is acceptable to the consumer and will provide a cost print out, bill of materials needed, instruction sheets for assembly, and suggested alternatives based on software specifications, inventory levels, upgrades, and revised inputs by buyer. The intended users could be individual consumers, purchasing agents, etc.

It is an object of the invention to provide consumers with a computerized system in order to help them create custom made design choices for furniture systems and other living space systems by using a data base that can provide for a ready visualization of the custom creation.

Another object is to provide a computerized system that will allow consumers to pick and choose from different custom interior design arrangements and to provide them with a ready break down of the costs, the availability, of such a particular arrangement.

Another object is to provide a method for shopping for interior design arrangements that allows the consumer to pick and choose particular components without taking time away from the store personnel. Such time consuming practices as determining component availability, determining costs of alternative designs and providing a price list and a bill of materials can be done at the computer terminal where the consumer is making and displaying his design choices so that he or she can take his bill of materials to the check out area and make payment arrangements.

Other objects will become apparent to those skilled in the art once the invention is shown and described.

DESCRIPTION OF PREFERRED EMBODIMENT

Figure 1:
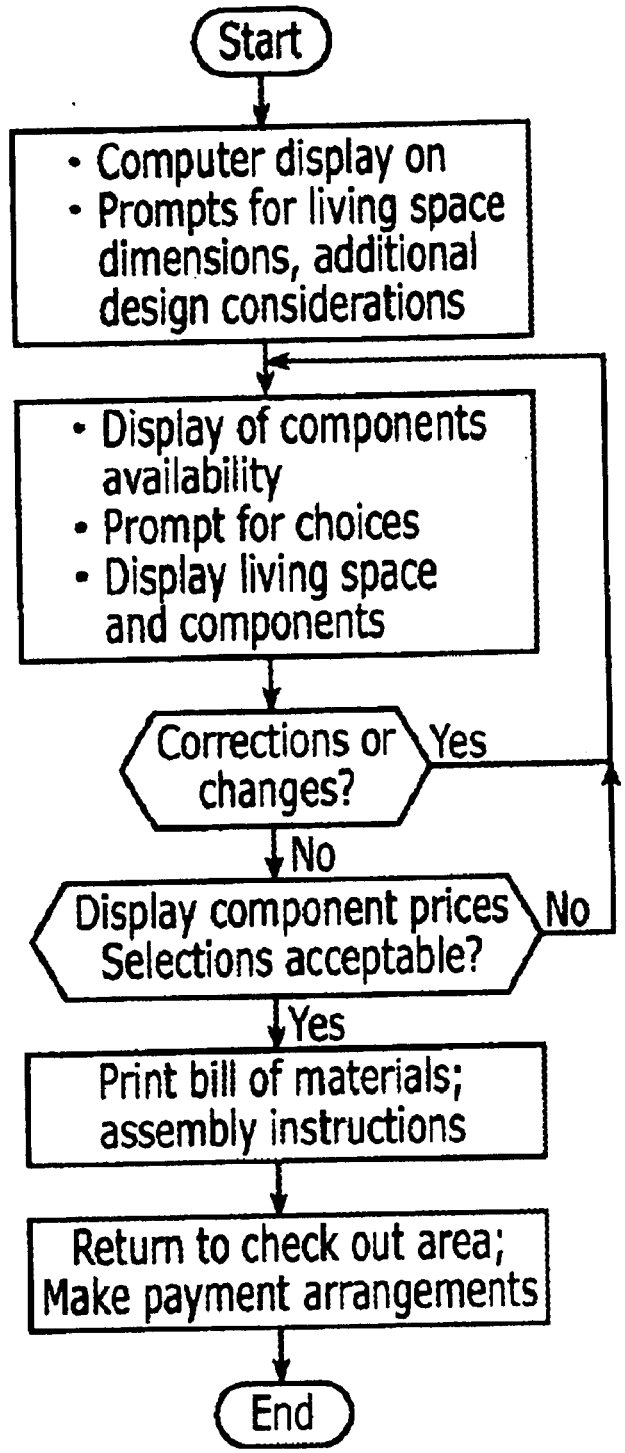
FIG. 1 Flow chart of retail operations for customizing and checking out.
Figure 2:
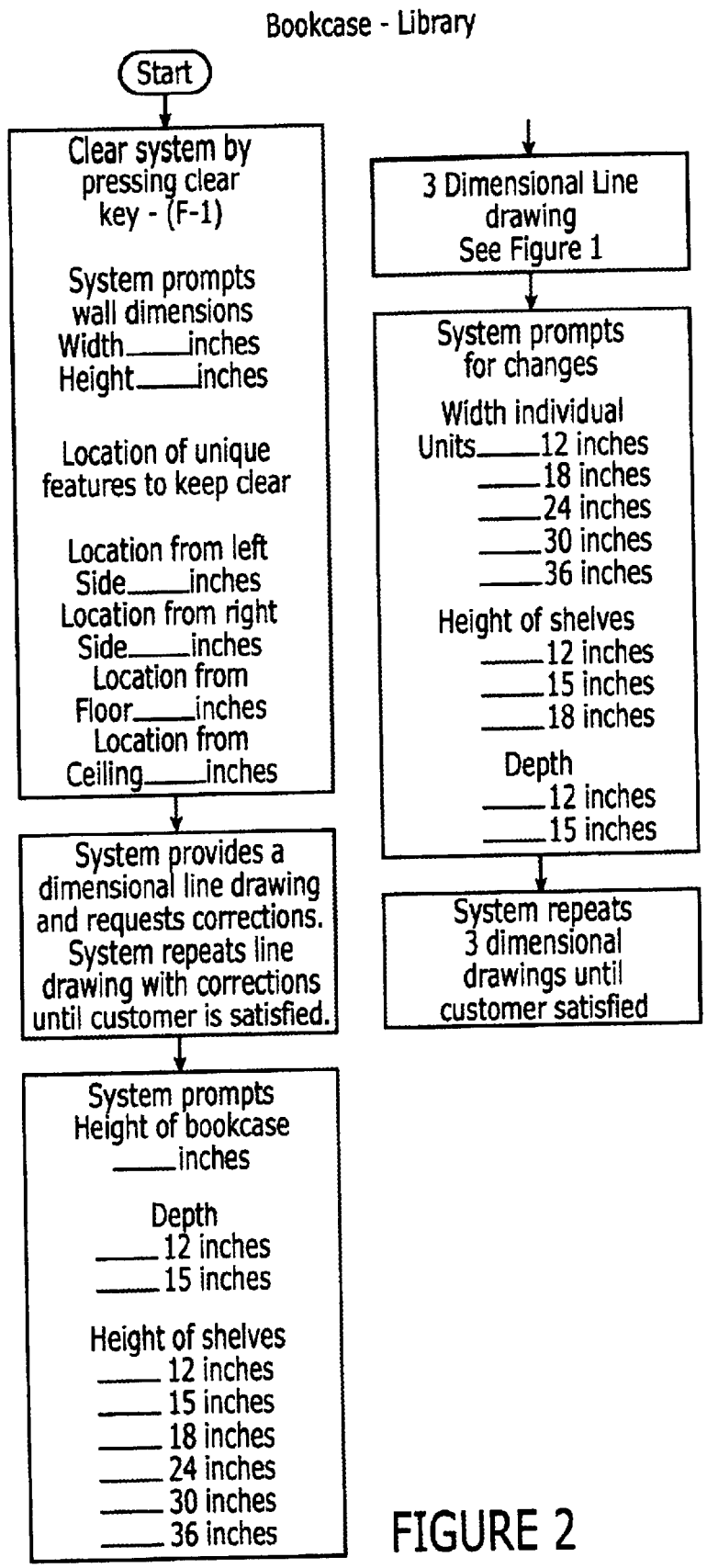
FIG. 2 example of a set of prompts provided by the program for the system.
Figure 3:
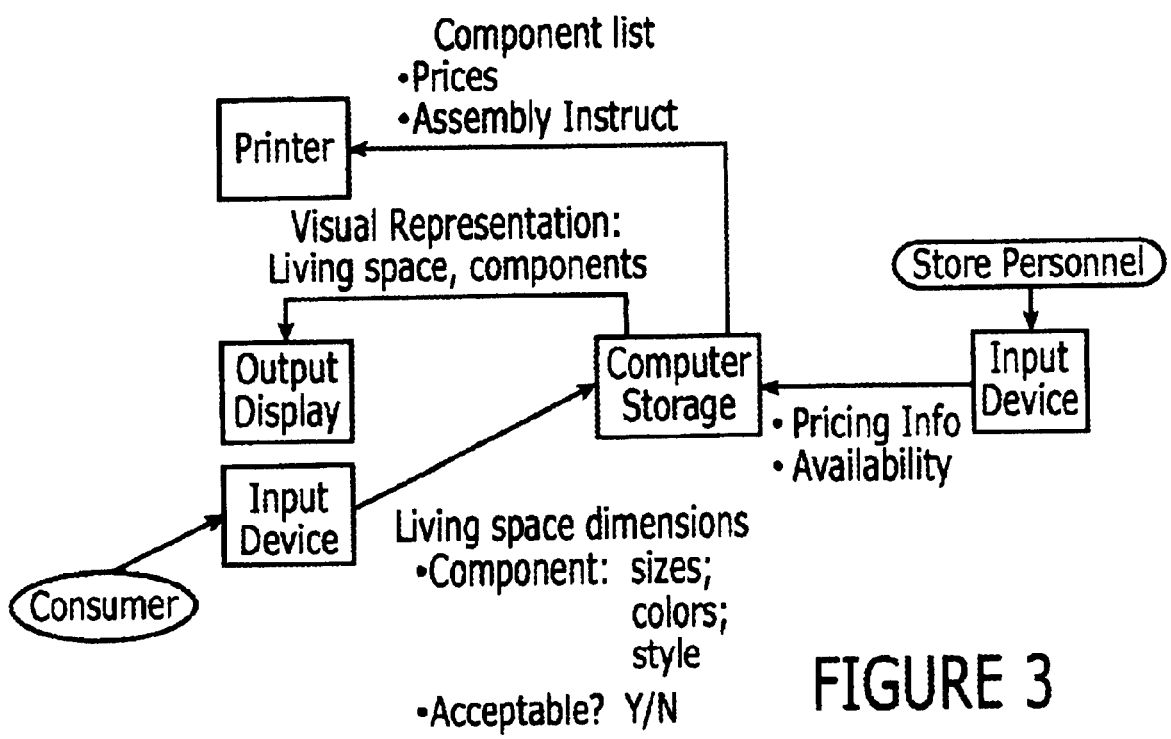
FIG. 3 Overall arrangement of working parts of system.

The overall designing and checking out process is shown in flow chart of FIG. 1 which illustrates the major steps in a software program that would be run on the computer in conjunction with the check out process described herein. Note that only some of the steps in the overall process are done with a computer, the final check out step is done by the consumer when he takes the bill of materials back to the check out area. FIG. 3 shows the overall arrangement of the computer related hardware components, e.g. storage, I/O devices, etc.

The system and process is designed for retail showrooms that present standard off-the-shelf components available to the consumer typically through a centralized warehouse and/or distributor. Some items (components) may be available directly at the showroom or retail outlet. Items, and hence, interior design choices, are mainly displayed at such a show room. The actual items are often available on-site for immediate purchase and use and/or shipped from a manufacturer or centralized outlet. When the customer goes into such a showroom he or she may first view examples of packaged systems and then decide that he wants to design his own living or working space with those standard components that are available from that retailer.

Store personnel would then direct the consumer to a computer terminal (output display shown in FIG. 3) where the consumer can work on such terminal as a do it yourself process by using the program that is run with the aid of a computer. Stored information in the computer system would include that store's particular pricing structure, the sizes available for both actual components (i.e. those components on hand at the store) and available components (i.e. those components that are in stock or available on order from manufacturer). Such system will keep track of actual inventory in the store through the use of bar codes and indicates to the consumer the available inventory items when he or she is considering alternatives. The computer may also provide for specials including those items that the stores wishes to move and are so priced accordingly, sale priced items, etc.

As seen in FIG. 1, during the first step, the computer monitor will provide a prompt that asks the consumer what sort of system this will be (e.g. shelves, bookcases, etc.) and then to give the dimensions of the living space, for example the dimensions of a closet where shelves will go. In addition, the computer will prompt for other information that is pertinent to the design under consideration, e.g. in the case of a book case there might be a space that needs to be kept clear on both sides of the case. The consumer will input information pertaining to the dimensions of that particular living space that he want to custom design. Such prompting information will be provided by the computer and displayed on the computer screen. For instance, if the consumer is working on his bookshelf he would input dimensions pertaining to the height, length and width of the bookshelf. Using a key pad, the consumer will input numbers corresponding to the measurements of his closet. Prompts on the monitor will indicate which dimension is being referred to. For example, the monitor screen will ask "height of shelf?" The consumer will input a numerical value, the monitor will indicate whether this is English or metric units. Then the computer will prompt in a similar manner for the width, and depth, etc.

The computer will then provide a two dimensional line drawing on the monitor of the space under consideration. The computer will then provide a display of component choices, e.g. shelves of different sizes, from a set of standard available components. For each of the components the computer will also indicate available colors, pricing, availability (e.g. in store or must be ordered) etc. The computer will then provide a three dimensional display of the components chosen by the consumer and impressed upon the living space. The computer will the prompt the consumer for changes and corrections.

In the case of a cabinet for example, the software will then provide a prompt to ask the consumer on whether he/she wants drawers and how many. Then prompts on details such as color, style, and other details as they become relevant. The retailer may add or omit such detailed information in the system. The software system will prompt the customer, for example in a cabinet, on the desirability of drawers, shelves, shoe storage, long items, special storage needs, whether for child or adult, etc. The system designs and provides a graphic depiction of each component or unit with a price associated with each and then provides alternative design choices with pricing. The computer will provide different component combinations that can fit the customers design parameters that he/she indicated. E.g. for a 72" book shelf height, there are several different combinations of 12", 18", 24", 30" and 36" shelves that can fit such a unit. The computer will provide a list of different combinations of these sized shelves any of which can fit the 72" width. The customer will then indicate through the computer input device which of these combinations is acceptable to him/her.

This process can go on for as long as the consumer wishes to view different arrangements for aesthetic effect and for pricing and availability. At the end of the on screen designing process, the consumer will be prompted as to whether the design is acceptable or not and then presented with pricing information on the scheme. This should be for overall costs and may be broken down by unit. The consumer may accept or reject this statement and then go back through the process again in order to choose materials and components that may be more acceptable in terms of price. The computer can present pricing information at the same time as the new choices are made in order to help this process.

After the consumer is satisfied he indicates by answering a prompt and the program goes through a final process where a bill of materials including pricing is produced and the assembly instructions are printed based upon those particular components that have been chosen. The consumer will then take the bill of materials back to check out area where he or she can make payment arrangements.

The computer has in connection with it a data base (see "computer storage" in FIG. 3) having information relevant to each unit or sub component of the overall design set up. The data base should have information pertaining to the price, the dimensions, a visual representation and the availability for each part that might be selected by the consumer. In addition, the data base may have information pertaining to different colors, perhaps their may be some additional price difference for different colors, or there may be limited availability for certain colors.

Depending on the particular store, customer may pick materials based on BOM (bill of materials) or the store may do it, whatever the policy is of selling unit. This store may decide that the best method for a particular design is to use glue and nails for that particular design choice and their system would be programmed to suggest that to the consumer at the time of check out.

The computer system should have data storage buffer systems or similar systems that can temporarily hold that information relevant to each part or component. Such information is made more accessible by the use of such buffer in terms of the access time for the computer. For example, as each item is selected pricing information for that item is called up by the computer from the data storage (presumably on a hard drive or similar storage device) and then stored in a cache or buffer (e.g. a RAM cache) or similar device in the system that will allow the computer to readily recall such data without having to bring it up from the hard drive all over again. That way, when the consumer is ready for the pricing of his arrangement these prices can be readily brought out of the buffer, presented as a readout on the computer screen along with total price, etc. Similar methods may be used for the other information associated with each item, e.g.: availability, color choices, order numbers for each component, etc.

Information pertaining to the manufacture and ordering of each unit can be associated with the items in the data base. For example, the manufacturer's stock order number can be associated with each part in order that a separate list of component parts may be sent to the manufacturer so that a ready to build set of components can be ordered and sent to the manufacturer, see "printer" in FIG. 3. Similar information pertaining to the expected time frame for ordering such components may also be made available, either on the monitor and/or the print out at the store. These data may be updated on a regular basis by the retailer as need be, see "store personnel" and "input device" in FIG. 3.

Upon the consumer arriving at a design scheme that suits him or her the computer will print out an upgraded pricing chart for customer, a bill of materials for the manufacture, the layout of the plan with dimensions, assembly instructions, and expected time frame, if requested.

I claim:

1. A pricing and ordering system for custom design of interior layouts using standard off the shelf components comprising: a computer storage and retrieval device in connection with a display monitor, said computer having a means for providing visual representations of said components on said display monitor, said system including a means to maintain and update inventory information associated with each of said components, said inventory information comprising pricing of said components, the number of said components available at a given store location and the expected timeframe of when more of said components will be available at said location, a means for displaying said inventory information associated with a given component in response to commands input by the user; said computer having a means to update said inventory information regarding pricing and availability of said components.

2. The system of claim 1 having an input means in connection with said computer for a consumer to enter information pertaining to dimensional parameters of an interior space, said parameters including the height and width of said interior space, said inventory information further comprising dimensional information associated with each of said components, said computer having a means for displaying combinations of said components that will fit within said dimensional parameters.

3. The system of claim 2 having a means to prompt said user to make a non final choice of said components and having a means to calculate and display a total price corresponding to said components of said non final choice.

4. The system of claim 3 wherein said computer has a means for providing alternative color choices for said display of said components.

* * * * *